United States Patent
Hamway et al.

(10) Patent No.: US 10,120,722 B2
(45) Date of Patent: Nov. 6, 2018

(54) REORDERING WORKFLOWS FOR NETWORK PROVISIONING BY USING BLOCKING PENALTY AND COMPOUNDED FAILURE RISK VALUES FOR TASKS

(71) Applicant: Telefonaktiebolaget LM Ericsson (publ), Stockholm (SE)

(72) Inventors: Ron Hamway, London (GB); Paul Ballman, Monroe Township, NJ (US); Calin Curescu, Solna (SE); Craig Donovan, Stockholm (SE); Curtis Goedde, Hillsborough, NJ (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 248 days.

(21) Appl. No.: 15/113,881

(22) PCT Filed: Jan. 31, 2014

(86) PCT No.: PCT/US2014/014110
§ 371 (c)(1),
(2) Date: Jul. 25, 2016

(87) PCT Pub. No.: WO2015/116155
PCT Pub. Date: Aug. 6, 2015

(65) Prior Publication Data
US 2016/0350160 A1    Dec. 1, 2016

(51) Int. Cl.
*G06F 9/50* (2006.01)
*G06F 17/30* (2006.01)
(Continued)

(52) U.S. Cl.
CPC .......... *G06F 9/5038* (2013.01); *G06F 9/4881* (2013.01); *G06F 17/3053* (2013.01);
(Continued)

(58) Field of Classification Search
None
See application file for complete search history.

(56) References Cited

U.S. PATENT DOCUMENTS 7,389,358 B1    6/2008   Matthews et al.
8,583,467 B1 *  11/2013  Morris ................... G06Q 10/06
                                               705/7.22
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.0.0, Dec. 2013, pp. 1-208.

*Primary Examiner* — Eric C Wai
(74) *Attorney, Agent, or Firm* — Murphy, Bilak & Homiller, PLLC (57) ABSTRACT

According to the teachings herein, provisioning operations carried out via electronic processing in a communication network (60) benefit from the use of reordered workflows (20) having task orderings that are at least partly optimized with respect to task failure probabilities and/or resource-blocking penalties. The reordered workflows (20) are obtained by optimizing predefined provisioning workflows (10). Each predefined workflow (10) comprises two or more tasks (12) ordered along one or more task execution paths (14) in a task tree (16), according to a default task ordering that reflects any required inter-task dependencies but, in general, does not reflect any optimization in terms of failure penalties, resource blocking, etc. Among the several advantages provided by the teachings herein, carrying out provisioning operations in accordance with reordered workflows (20) wastes fewer compute cycles and reduces the needless blocking of network resources in the event of provisioning task failures.

18 Claims, 5 Drawing Sheets

(51) Int. Cl.
*G06F 9/48* (2006.01)
*G06F 9/46* (2006.01)
*H04L 12/24* (2006.01)
*G06Q 10/06* (2012.01)

(52) U.S. Cl.
CPC ......... *G06Q 10/06* (2013.01); *G06Q 10/0633* (2013.01); *H04L 41/0806* (2013.01)

(56) References Cited

U.S. PATENT DOCUMENTS

| | | |
|---|---|---|
| 2007/0204053 A1 | 8/2007 | Auzar et al. |
| 2009/0077478 A1 | 3/2009 | Gillingham et al. |
| 2009/0327465 A1 | 12/2009 | Flegg et al. |
| 2010/0010858 A1* | 1/2010 | Matoba ................ G06F 9/5038 705/7.27 |

* cited by examiner

REORDERING WORKFLOWS FOR NETWORK PROVISIONING BY USING BLOCKING PENALTY AND COMPOUNDED FAILURE RISK VALUES FOR TASKS

TECHNICAL FIELD

The present invention generally relates to communication networks and particularly relates to managing workflows used for communication network provisioning

BACKGROUND

The term "workflow" or "provisioning workflow" denotes a defined set of provisioning tasks that must be carried out, to configure network resources for a given communication network service or function. A workflow in electronic form comprises a record, which generically means a file, message or other data structure that lists or enumerates the provisioning tasks included in the workflow. Where provisioning is automated, i.e., carried out by one or more nodes or other entities within the communication network, a workflow may be understood as the scripting or programmatic enumeration of tasks, to be carried out by, or at least initiated by, the entities responsible for parsing the workflow.

Commonly, there is some interdependency between certain ones of the tasks comprising a given workflow. For example, one task may depend on the results of another task, meaning that the other task must be performed first. Sometimes there are longer chains of dependencies, where a series of tasks depends on the results of one or more preceding tasks. Indeed, the typical workflow may be represented as a "tree diagram" or other hierarchical graph, where individual provisioning tasks are represented as nodes, which are hierarchically arranged at different levels in the diagram and interconnected according to one or more execution paths that are defined by the applicable task interdependencies.

Generally, however, there is some degree of freedom with respect to task execution. For example, multiple independent tasks within a defined workflow can be performed in arbitrary order, if all other things are equal. The ordering freedom generally increases as the number of tasks within a workflow increases, particularly when the workflow includes multiple independent tasks at one or more hierarchical levels, e.g., multiple independent tasks at a given node level within the workflow tree and/or multiple independent execution paths or branches within the tree.

However, for a number of reasons, including combinational complexity and, at least heretofore, a lack of appropriate metrics or parameters for making optimal task ordering decisions, workflows generally are predefined and executed according to some default, non-optimized task ordering. It is recognized herein that default task ordering can have a high "cost," where cost can be measured in a number of ways, such as cost in terms of wasted network signaling, and/or wasted computational cycles.

Additionally, it is recognized herein that the process of task ordering is complicated by the possible presence of tasks within a given workflow that cannot be "rolled back." A task that cannot be rolled back is one that, if it fails and must be repeated, so too must all of its preceding tasks, or at least all preceding tasks lying along its execution path within the task tree must be performed again.

SUMMARY

According to the teachings herein, provisioning operations carried out via electronic processing in a communication network benefit from the use of reordered workflows having task orderings that are at least partly optimized with respect to task failure probabilities and/or resource-blocking penalties. The reordered workflows are obtained by optimizing predefined provisioning workflows. Each predefined workflow comprises two or more tasks ordered along one or more task execution paths in a task tree, according to a default task ordering that reflects any required inter-task dependencies but, in general, does not reflect any optimization in terms of failure penalties, resource blocking, etc. Among the several advantages provided by the teachings herein, carrying out provisioning operations in accordance with reordered workflows wastes fewer compute cycles and reduces the needless blocking of network resources in the event of provisioning task failures.

In one example, a network node in a communication network performs a method of managing workflows for communication network provisioning. The method includes obtaining an electronic record representing a predefined workflow comprising two or more tasks ordered along one or more task execution paths in a task tree. The method further includes obtaining compounded failure risk values for one or more of the tasks in the predefined workflow. Additionally, for one or more of any tasks in the predefined workflow that cannot be rolled back, the method includes obtaining blocking penalty values. For any given task, its compounded failure risk value represents a combination of the probability that execution of the given task will fail and the probabilities that execution of any child tasks in the task tree will fail. Further, for any given task that cannot be rolled back, its blocking penalty value indicates a cost associated with a temporary blocking of resources arising from an execution failure of the given task.

The method continues with generating a reordered workflow having a new task ordering that is at least partly optimized with respect to the compounded failure risk values and the blocking penalty values. Generation of the reordered workflow is based on, subject to any inter-task dependencies, ordering tasks having higher compounded failure risk values before tasks having lower compounded failure risk values, and ordering tasks that cannot be rolled back after tasks that can be rolled back. These ordering operations include ordering the tasks that cannot be rolled back according to a descending ranking of the corresponding blocking penalty values, and the method includes dispatching the reordered workflow.

As another example, a network node in one or more embodiments is configured for managing workflows for use in provisioning in a communication network. The network node comprises an interface circuit configured to obtain an electronic record representing a predefined workflow comprising two or more tasks ordered along one or more task execution paths in a task tree, and a processing circuit that is operatively associated with the interface circuit.

The processing circuit is configured to obtain compounded failure risk values for one or more of the tasks in the predefined workflow and, additionally, for one or more of any tasks in the predefined workflow that cannot be rolled back, obtain blocking penalty values. The processing circuit is further configured to generate a reordered workflow having a new task ordering that is at least partly optimized with respect to the compounded failure risk values and the blocking penalty values. The reordering comprises, by, subject to any inter-task dependencies, ordering tasks having higher compounded failure risk values before tasks having lower compounded failure risk values, and ordering tasks that cannot be rolled back after tasks that can be rolled back.

The reordering includes ordering the tasks that cannot be rolled back according to a descending ranking of the corresponding blocking penalty values, and the processing circuit is further configured to dispatch the reordered workflow.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
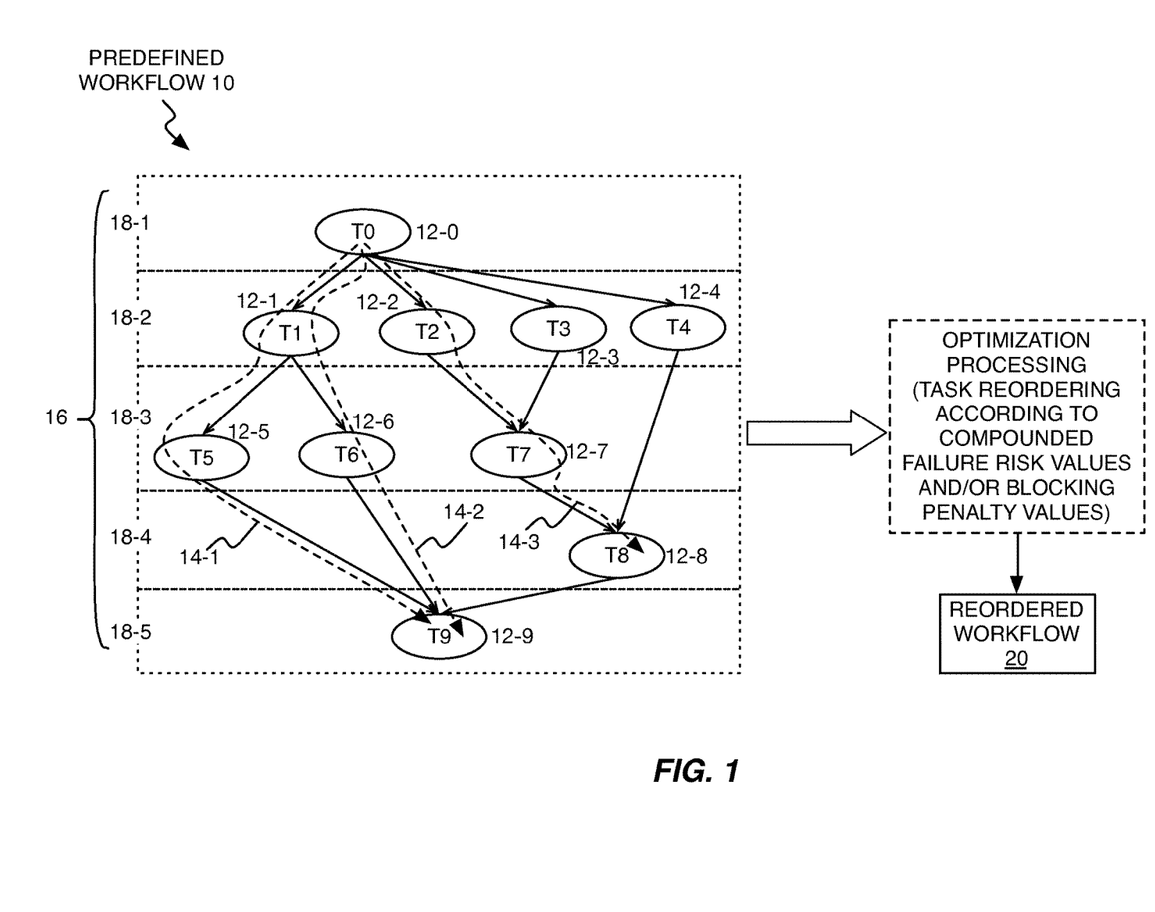
FIG. 1 is a diagram of an example predefined workflow, as may be conventionally known for provisioning a service or feature in a communication network, and which, according to processing taught herein, is optimized to obtain a corresponding reordered workflow.

FIG. 1 illustrates a predefined workflow 10 comprising two or more provisioning tasks 12 ordered along one or more task execution paths 14 in a task tree 16. In particular, the task tree 16 is represented by a number of tree levels 18. In the non-limiting example, there are ten tasks, which are numbered as tasks 12-0 through 12-9, and further labeled as "T0" through "T9". Where suffixes are not needed for clarity, the reference number "12" is used to refer to any given task in the singular sense, or to any given tasks in the plural sense. The same selective use of reference number suffixes is adopted for task execution paths 14 and task tree levels 18.

In the example depicted in the figure, one sees that any given level 18 in the tree 16 may include any number of tasks 12. For example, tree level 18-1 includes a first or starting task 12-0 (labeled as T0), while tree level 18-2 includes four tasks 12-1, 12-2, 12-3 and 12-4, labeled as T1, T2, T3 and T4, respectively. Other details worth noting include the presence of various task execution paths 14, e.g., the example paths 14-1, 14-2 and 14-3. The task execution paths 14 in the predefined workflow 10 represent a default task ordering, which generally is not optimized with respect to the probabilities of task failure—i.e., the probability that a given task will fail before its execution has been completed. Further in the predefined workflow 10, the task execution paths are not optimized with respect to resource blocking penalties, which can be understood as some "cost", whether measured in time, amount, criticality, etc., associated with those network resources that cannot be immediately released or cleared when a provisioning task 12 fails.

Of course, the task execution paths 14 will reflect any required task interdependencies—such as when one given task 12 must be performed before or after another given task 12. The teachings herein do not violate any inter-task dependencies that exist within a given predefined workflow 10. However, subject to any such inter-task dependencies, a reordered workflow 20 is generated from a predefined workflow 10. The reordered workflow 20 is advantageously reordered such that it is at least partly optimized with respect to what is referred to herein as "compounded failure probabilities" and, to the extent they are applicable to any tasks 12 included in the predefined workflow 10, blocking penalty values. Thus, based on processing discussed by way of example in the succeeding details, a reordered workflow 20 is generated from a predefined workflow 10.

FIG. 1 illustrates the generation of a reordered workflow 20, based on at least partly optimizing the task ordering of the predefined workflow 10. The reordering processing exploits any existing degrees of freedom in the default task ordering represented by the predefined workflow 10, to obtain the at least partly optimized reordered workflow 20. In the course of such optimization processing, one or more tasks 12 are reordered so that they will be executed in a different order than that set forth in the default ordering represented by the predefined workflow 10. Reordering may change the task execution paths 14 and may shift tasks 12 between tree levels 18.

Figure 2:
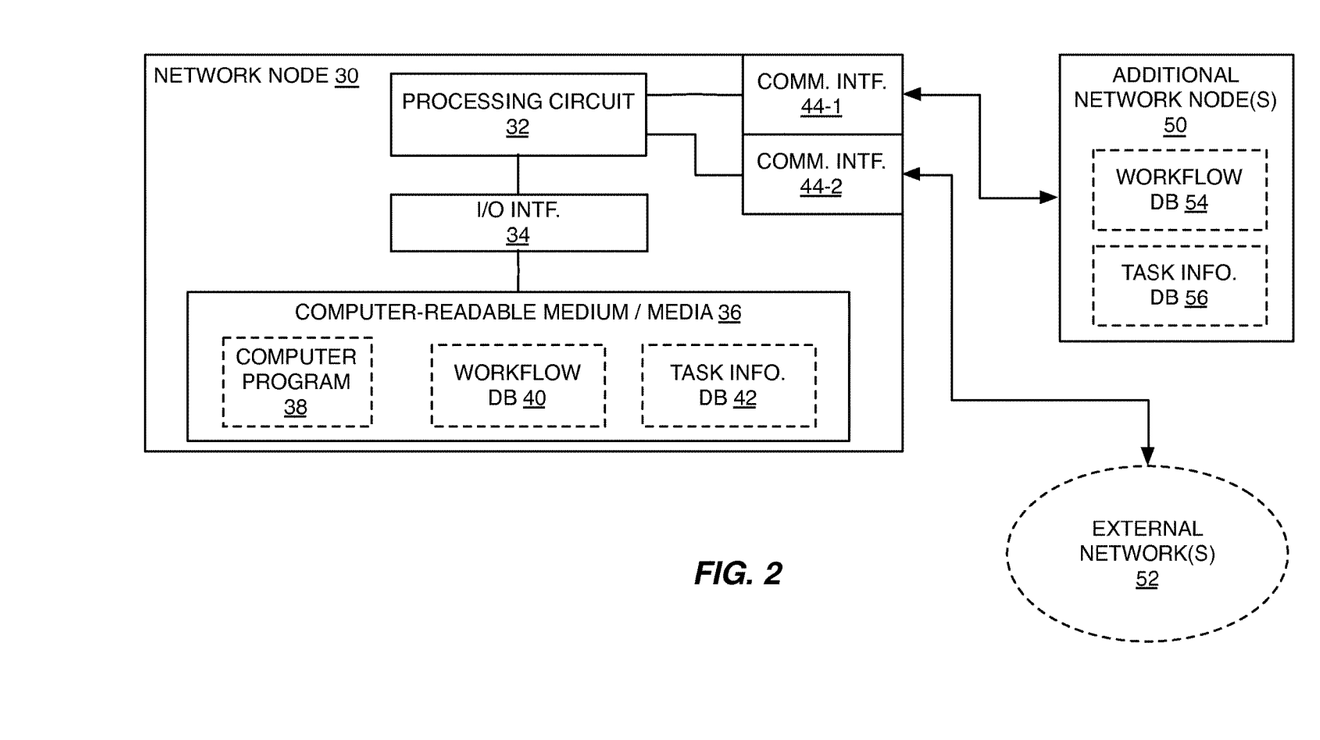
FIG. 2 is a block diagram of one embodiment of a network node configured for reordering workflows.

In an example case depicted in FIG. 2, the predefined workflow 10 may be obtained from a workflow database, and the information used for optimized reordering may be obtained from a task information database. These two databases may be the same—i.e., one database includes both types or sets of information—or they may be distinct databases. Moreover, the use of databases to store workflows and optimization information, and the details if such databases are used, are not limiting with respect to the broadest aspects of the teachings herein.

Considering FIG. 2 in more detail, one see a network node 30 according to an example embodiment contemplated herein. The network node 30 includes a processing circuit 32, an input/output, I/O, interface 34, and computer-readable media or medium 36. The media/medium 36 comprises, for example, FLASH, EEPROM, Solid State Disk, hard disk, or other non-volatile storage, and it generally further includes volatile or working memory, such as SRAM, DRAM, or the like. For simplicity, the network node 30 is described hereafter as including a computer-readable medium 36, and the computer-readable medium 36 shall be understood as providing non-transitory storage. In an example case, the computer-readable medium 36 stores a computer program 38, a workflow database 40 and a task information database 42.

The network node 30 further includes a communication interface 44, which in actuality may comprise one interface or more than one interface. For illustrative purposes, two communication interfaces 44-1 and 44-2 are shown, with the communication interface 44-1 configured for communication with one or more other network nodes—shown as "additional network node(s) 50" in the diagram. The communication interface 44-2 is configured for communication with one or more external networks 52. Thus, a "communication interface" may include the processing circuitry implementing the applicable signaling protocol or protocols, or includes the physical-layer circuitry used to convey the associated signaling, or both. Hereafter, the phrase "communication interface 44" will be used for brevity. Note that the I/O interface 34 may also be generically referred to as a communication interface, albeit for communications within the node 30 between the processing circuit 32 and the computer-readable medium 36.

The workflow database 40 and the task information database 42 may be originated or otherwise created in the network node 30. Alternatively, any one or more of the other network node(s) 50 may store a workflow database 54 and a task information database 56. The workflow database 54 may serve as a repository, at least temporarily, for predefined workflows 10, and the task information database 56 may serve as a repository, at least temporarily, for task failure risk information, task blocking penalties, etc. In such configurations, the network node 30 may work directly from the databases 54 and 56, or it may transfer or copy at least a portion of their contents into the "local" databases 40 and 42, so that it can work from those local databases. In an example case, the network node 30 maintains the local databases 40 and 42 in synchronization with the remote databases 54 and 56.

Of course, the teachings herein allow for substantial flexibility in terms of where and how the relevant information is stored and the above database examples will be understood as being non-limiting. More broadly, the network node 30 is configured for managing workflows for use in provisioning in a communication network—not shown in FIG. 2. The network node 30 in an example configuration includes an interface circuit that is configured to obtain an electronic record representing a predefined workflow 10 comprising two or more tasks 12 ordered along one or more task execution paths 14 in a task tree 16. Here, the interface circuit through which the network node 30 obtains the predefined workflow 10 may comprise an internal interface, e.g., the I/O interface 34 to the workflow database 40 in the computer-readable medium 36. Alternatively, the interface circuit in question is the communication interface 44, which communicatively couples the network node to one or more other network nodes 50 and/or to one or more external networks 52.

The network node 30 further includes the aforementioned processing circuit 32, which is operatively associated with the interface circuit 34 and/or 44 and is configured to obtain compounded failure risk values for one or more of the tasks 12 in the predefined workflow 10. In some embodiments, the processing circuit 32 obtains compounded failure risk values for each task 12 that is listed in the predefined workflow 10. Additionally, for one or more of any tasks 12 in the predefined workflow 10 that cannot be rolled back, the processing circuit 32 is configured to obtain blocking penalty values. In some embodiments, the processing circuit 32 obtains blocking penalty values for each task 12 in the predefined workflow that cannot be rolled back.

For any given task 12, the compounded failure risk value represents a combination of the probability that execution of the given task 12 will fail and the probabilities that execution of any child tasks 12 in the task tree 16 will fail. A child task 12 is any task that depends from the parent task 12. Further, a task 12 that cannot be rolled back is a task whose failure results in a loss or blocking of resources, at least on a temporary basis. For example, it may be that communication or processing resources are allocated during a given provisioning task 12. This given task 12 will be considered to be a task that cannot be rolled back, if those allocated resources cannot be immediately released for reallocation. Thus, for any given task 12 that cannot be rolled back, the blocking penalty value indicates a cost associated with a temporary blocking of resources arising from an execution failure of the given task 12. Here, "cost" has a broad meaning, and example "costs" can be measured in terms of any one or more of the following parameters or metrics: the amount of resources, the criticality or preciousness of the resources, the type of resources, the ownership or affiliation of the resources, the duration of the resource blockage, the signaling overhead associated with allocation/re-allocation of resources, and, of course, any actual monetary costs or penalties that might be involved.

Correspondingly, the processing circuit 32 of the network node 30 is configured to generate a reordered workflow 20 having a new task ordering that is at least partly optimized with respect to the compounded failure risk values and the blocking penalty values. The processing circuit 32 performs the reordering, by, subject to any inter-task dependencies, ordering tasks 12 having higher compounded failure risk values before tasks 12 having lower compounded failure risk values, and ordering tasks 12 that cannot be rolled back after tasks 12 that can be rolled back. The ordering of tasks that cannot be rolled back includes ordering the tasks 12 that cannot be rolled back according to a descending ranking of the corresponding blocking penalty values.

The processing circuit 32 is further configured to dispatch the reordered workflow 20. Here, "dispatching" the reordered workflow 20 comprises, for example, storing the reordered workflow 20 as a replacement for the predefined workflow 10 from which it was derived, or storing the reordered workflow 20 in conjunction with the predefined workflow 10. Storing in this sense comprises, by way of example, storing the reordered workflow 20 in a database—e.g., in the workflow database 40 or 54. Additionally, or alternatively, "dispatching" the reordered workflow 20 comprises executing all or some of the provisioning tasks 12 in the reordered workflow 20 according to the optimized task ordering set forth in the reordered workflow 20. As a further alternative or addition, "dispatching" the reordered workflow 20 comprises transmitting all or a portion of the reordered workflow 20, or indications thereof, to one or more other network nodes 50, for storage and/or execution.

Thus, in an example embodiment, the processing circuit 32 is configured to dispatch the reordered workflow 20 by storing the reordered workflow 20 in a workflow database 40 or 54 as a substitute for the predefined workflow 10. The interface circuit 34 or 44, or another communication interface included within the network node 30 is configured for accessing the workflow database 40. In the same or other embodiments, the processing circuit 32 is configured to obtain the electronic record comprising the predefined workflow 10 by reading the electronic record from the workflow database 40 or 54.

Similarly, in one or more embodiments, the processing circuit 32 is configured to obtain the compounded failure risk values for one or more of the tasks 12 in the predefined workflow 10 by reading the compounded failure risk values from a task information database 42 or 56 that stores the compounded failure risk values, or that stores per-task failure risk values which are not compounded, in which case the processing circuit 32 is configured to obtain the compounded failure risk value for a given task 12 by calculating the compounded failure risk value for the task 12 as a function of its failure risk value and as a function of the failure risk values of its child tasks 12.

As for ordering tasks 12 according to their compounded failure risk values, the processing circuit 32 in an example implementation is configured to order the tasks 12 having higher compounded failure risk values before the tasks 12 having lower compounded failure risk values, based on being configured to: obtain an average execution time value for each task 12 within the predefined workflow 10 that has one or more degrees of freedom with respect to being reordered, and ranking each such task 12 according to corresponding ranking metrics individually computed for each such task 12 as a ratio of the compounded task failure risk of the task 12 to the average execution time of the task 12; and ordering the ranked tasks 12 for the reordered workflow 20, so that tasks 12 having higher task failure risks per unit of time are ordered before tasks 12 having lower task failure risks per unit of time.

While the teachings herein contemplate several approaches obtaining the compounded failure risk values and the associated, supporting information, in some embodiments the processing circuit 32 is configured to accumulate empirical data on the probability of task failure and average execution time for a plurality of predefined task types, and compute the compounded failure risk values for the one or more tasks 12 in the predefined workflow 10 from the empirical data. The network node 30 and/or one or more other network nodes 50 are configured to generate or receive information indicating the execution times of given provisioning tasks as they are performed, and to detect or receive indications of provisioning task execution failures. This information includes, in an example implementation, parameters or other information that classifies tasks by any one or more of the following parameters: task type, resource types, resource owner, involved networks and/or network operators, time-of-day, date, and geographic region. Execution times and failure rates may be parameterized according to these and other parameters, and the processing circuit 32 of the network node 30 may determine compounded failure risk values for given tasks 12 in a predefined workflow based on a detailed matching of the parameterized historical data against the actual task parameters.

Whether or not detailed task parameters are considered in estimating the compounded failure risk values, the processing circuit 32 in one or more embodiments is configured to generate a reordered workflow 20 from a predefined workflow 10 based on dividing the tasks 12 within the predefined workflow 10 into two subsets. The first subset includes the tasks 12 that can be rolled back, while the second subset includes the tasks 12 that cannot be rolled back.

For all tasks 12 in the first subset, the processing circuit 32 is configured to: compute a first ranking metric for each task 12 as a ratio of the compounded failure risk value of the task 12 to an average execution time of the task 12; and order the tasks 12 within the first subset of tasks 12 in descending order of the first ranking metrics, subject to any inter-task dependencies. For all tasks 12 in the second subset, the processing circuit 32 is configured to compute a second ranking metric for each task 12 as a ratio of the compounded failure risk value of the task 12 to the blocking penalty value of the task 12; and order the tasks 12 within the second subset in descending order of the second ranking metrics and subsequent to the tasks 12 ordered within the first subset of tasks 12, subject to any inter-task dependencies. The reordered workflow 20 generally will have the first subset of tasks 12 ordered before the second subset of tasks 12, with the tasks 12 within each subset ordered as just explained.

Further, in some embodiments, the processing circuit 32 is configured to generate the reordered workflow 20 based on controlling the task ordering according to an overall objective indicating whether the new task ordering shall be optimized with or without consideration of an overall workflow execution time. In particular, the processing circuit 32 in one or more embodiments is configured such that, if the overall objective indicates that the new task ordering shall be optimized without consideration of the overall workflow execution time, the new task ordering is strictly optimized according the compounded failure risk values. However, if the overall objective indicates that the new task ordering shall be optimized with consideration of the overall workflow execution time, new task ordering is locally optimized within, but not across, each of two or more parallel task execution paths 14 comprising the reordered workflow 20.

Figure 3:
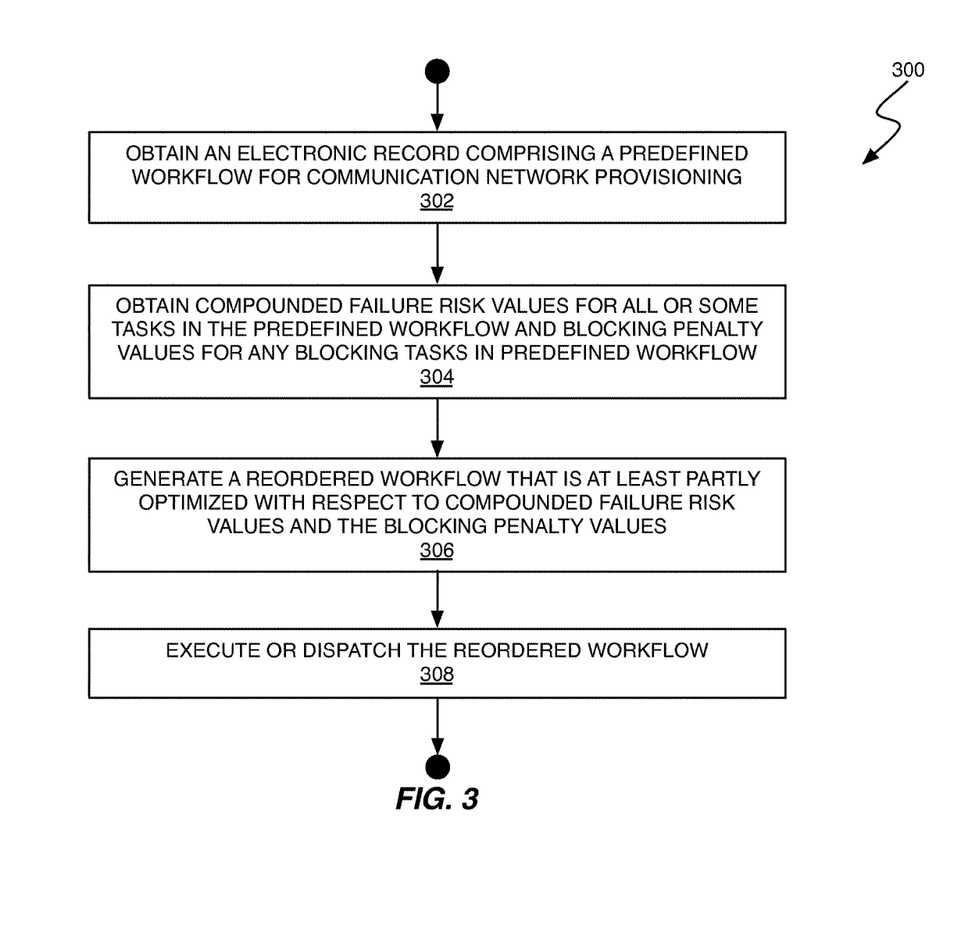
FIG. 3 is a logic flow diagram of one embodiment of a method of reordering workflows.

FIG. 3 illustrates one embodiment of an overall method 300 of managing workflows for communication network provisioning, such as may be performed by the network node 30. One or more steps of the method 300 may be performed in an order other than that suggested by the diagram. Additionally, or alternatively, one or more steps in the method 300 may be performed in parallel. Further, the method 300 may be repeated or looped for processing multiple predefined workflows 10, or may be executed in parallel fashion for simultaneously processing more than one predefined workflow 10.

Still further, in at least one embodiment, the network node 30 includes a CPU or other computer processing circuitry—e.g., the processing circuit 32—that is configured to perform the method 300 based on its execution of the computer program 38 stored in the computer-readable medium 36. Here, it will be understood that the computer program 38 comprises program instructions, the execution of which by the processing circuit 32, specially adapts the processing circuit 32 to perform the algorithm(s) set forth in FIG. 3 for the method 300.

With the above qualifications in mind, the method 300 includes obtaining (Block 302) an electronic record representing a predefined workflow 10 comprising two or more tasks 12 ordered along one or more task execution paths 14 in a task tree 16, according to a default task ordering. The method 300 further includes obtaining (Block 304) compounded failure risk values for one or more of the tasks 12 in the predefined workflow 10 and, additionally, for one or more of any tasks 12 in the predefined workflow 10 that cannot be rolled back, obtaining blocking penalty values. For example, task information within the predefined workflow 10 indicates whether a task can or cannot be rolled back, or the processing circuit 32 is configured to recognize which tasks can or cannot be rolled back, e.g., based on detecting the task type, detecting the involved resources, etc.

In any case, the compounded failure risk values and the blocking penalty values, if any are involved, may be obtained by reading task failure information from the task information database 42 or 56. For example, there may be a task ID, task name, task type or category identifier, or other identifying information for each given task 12 in the predefined workflow 10. The processing circuit 32 in one or more embodiments is configured to use such information to find the corresponding task failure probabilities, task execution times, and blocking penalty values in the task information database 42 or 56. That is, the predefined workflow 10 includes task names or other information that allows the processing circuit 32 to obtain the corresponding task failure probabilities, task execution times, blocking penalty values, etc., from the task information database 42 or 56, for the tasks 12 listed in the predefined workflow 10. It is also contemplated herein that such information could be included within the predefined workflow 10, for easy access.

Knowing the task failure rates or probabilities and task execution times for individual tasks 12 in the predefined workflow 10, the processing circuit 32 evaluates the task tree 16, which may be represented by inter-task dependency information embedded in the predefined task workflow 10, to determine parent-child relationships between the tasks 12. From there, the processing circuit 32 computes the compounded failure risk values for one, some, or all of the tasks 12 in the predefined workflow 10. In at least one embodiment, the processing circuit 32 computes the compounded failure risk value for all tasks 12 in the predefined workflow 10. As noted, for any given task 12, the compounded failure risk value represents a combination of the probability that execution of the given task 12 will fail and the probabilities that execution of any child tasks 12 in the task tree 16 will fail. Also previously noted, for any given task 12 that cannot be rolled back, the blocking penalty value indicates a cost associated with a temporary blocking of resources arising from an execution failure of the given task 12.

The method 300 further includes generating (Block 306) a reordered workflow 20 having a new task ordering that is at least partly optimized with respect to the compounded failure risk values and the blocking penalty values. The reordering is subject to any inter-task dependencies and it includes ordering tasks 12 having higher compounded failure risk values before tasks 12 having lower compounded failure risk values. The reordering further includes ordering tasks 12 that cannot be rolled back after tasks 12 that can be rolled back, including ordering the tasks 12 that cannot be rolled back according to a descending ranking of the corresponding blocking penalty values. Still further, the method 300 includes dispatching (Block 308) the reordered workflow 20.

Figure 4:
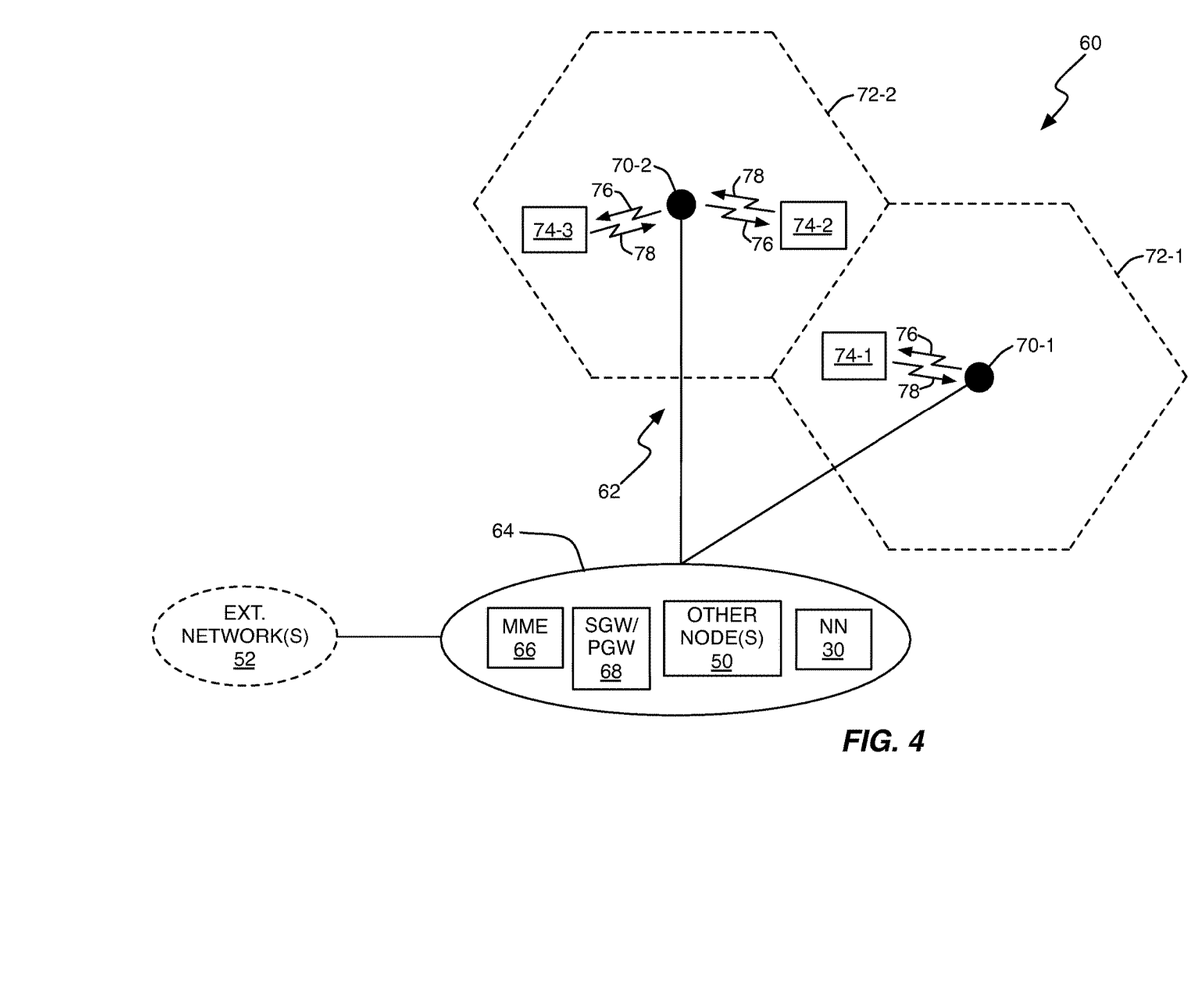
FIG. 4 is a block diagram of one embodiment of communication network, including a network node for reordering workflows.

FIG. 4 illustrates an example communication network 60 in which the teachings herein may be practiced. The network 60 comprises, for example a wireless communication network, such as one based on specifications promulgated by the Third Generation Partnership Project, 3GPP. Indeed, some of the nomenclature used in the network illustration follows the lexicon adopted by the 3GPP, but this usage should be understood as representing a non-limiting example of the network types to which the teachings herein are applicable.

In the example network 60, one sees a Radio Access Network or RAN 62 and an associated Core Network or CN 64. If the network 60 comprises a Long Term Evolution or LTE network, the RAN 62 is an Evolved Universal Terrestrial Radio Access Network or E-UTRAN, and the CN 64 is an Evolved Packet Core or EPC. Together, the E-UTRAN and EPC are referred to as an Evolved Packet System or EPS. See, for example, the 3GPP technical specification identified as TS 36.300.

The CN 64 in the illustrated example includes the network node 30, which may be a standalone node or which may be integrated with or co-located with another node in the CN 64, such as an Operations and Maintenance, O&M, node, or some other node within an Operations Support System, OSS, implemented in the network 60. The CN 64 further includes the aforementioned one or more other network nodes 50, along with additional entities, such as one or more Mobility Management Entities or MMEs 66, along with one or more Serving Gateways/Packet Gateways, SGW/PGW 68.

The example RAN 62 includes one or more base stations 70, shown here as base stations 70-1 and 702. In an LTE embodiment, the base stations 70 comprise eNodeBs or eNBs. The base stations 70 each provide service in one or more cells 72, e.g., the base station 70-1 provides service in a cell 72-1, while the base station 70-2 provides service in a cell 72-2. Each base station 70/cell 72 is configured to provide communication services to wireless communication devices 74. The wireless communication devices 74 may comprise various types of subscriber equipment, which are referred to as user equipment or UEs in the 3GPP lexicon. However, the wireless communication devices 74 may be essentially any type of wireless device or apparatus.

As such, the wireless communication devices 74 will be broadly understood as any device or apparatus that includes a communication transceiver and associated protocol processors and/or credentials, as needed, for connecting to and communicating with or through the network 60. As non-limiting examples, the wireless communication devices 74 include any one or more of the following: cellular telephones, including feature phones and/or smart phones, Portable Digital Assistants, tablets, laptops, modems or other network adaptors, and Machine-to-Machine, M2M, devices that use Machine Type Communications.

One sees in the illustrated example that the base station 70-1/cell 72-1 act as a serving base station/serving cell with respect to a wireless device 74-1. Similarly, the base station 70-2/cell 72-2 act as a serving base station/serving cell for the wireless devices 74-2 and 74-3. The base stations 70 communicate with the devices 74 via downlink signals 76, while the devices 74 communicate with their respective base stations via uplink signals 78. Of course, the teachings herein apply to other arrangements, such Carrier Aggregation or CA, service scenarios and Coordinated Multipoint, CoMP, transmissions, where more than one carrier or cell is used to serve a given wireless device 74. In any case, the MMEs 66 provide session management and mobility management for wireless devices 74 operating in the network 60, and the SGWs/PGWs 68 provide packet data connectivity between the wireless devices 74 and one or more external networks 52, e.g., the Internet or another packet data network.

In this illustrated context, the network node 30 provides reordered workflows 20, for use in provisioning resources within the network 60—including any illustrated entities and/or in one or more other entities that are not shown in the simplified network depiction. Additionally, or alternatively, the reordered workflows 20 may be used for provisioning operations performed in the one or more external networks 52, or in other affiliated networks not explicitly shown in FIG. 4. Broadly, the network node 30 obtains predefined workflows 10 that include provisioning tasks 12 having a default task execution ordering, and provides corresponding reordered workflows 20, in which the task ordering is at least partly optimized according to the teachings herein.

Figure 5:
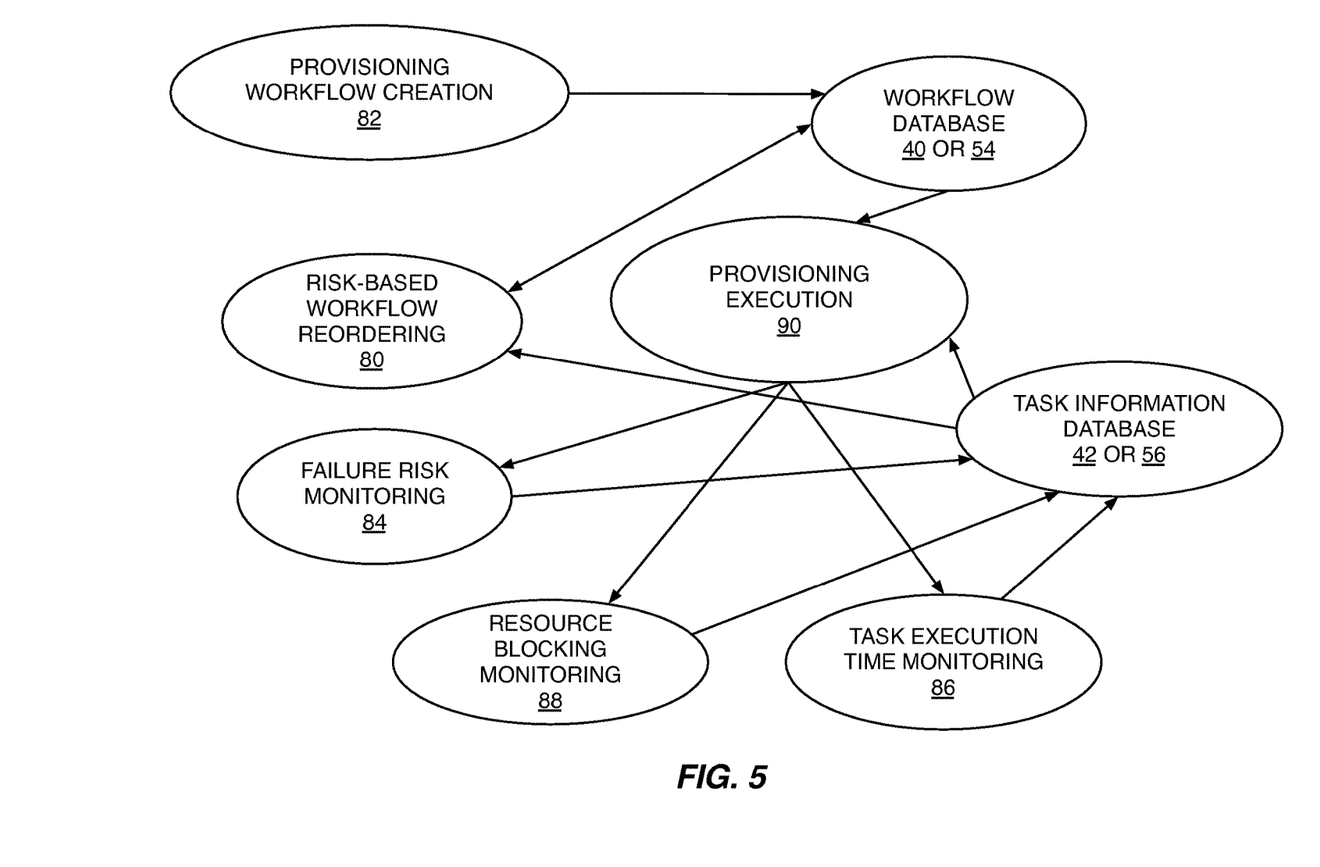
FIG. 5 is a block diagram of one embodiment of processing functions or nodes associated with reordering workflows.

An example depiction of these overall operations is shown in the functional processing diagram of FIG. 5, wherein the individual blocks or entities represent specific processing functions or operations performed by the network node 30 and/or by the one or more other network nodes 50. For example, the one or more other network nodes 50 perform the historical tracking or monitoring used to accumulate empirical data on task failure probabilities, task execution times, etc., and the network node 30 uses that information to generate the reordered workflows 20. In other embodiments, all of the functionality depicted in FIG. 5 is concentrated in the network node 30. Of course, the network node 30 may actually comprise more than one server or other computer system.

In FIG. 5, one sees that block 80 represents risk-based workflow rearrangement processing—i.e., the processing disclosed herein whereby a reordered workflow 20 is generated from a predefined workflow 10. Block 80 receives inputs from, e.g., the workflow database 40 or 54, the task information database 42 or 56. Block 82 represents a provisioning workflow creation process 82 that generates the predefined workflows 10, for example, which are stored in the workflow database 40 or 54. Further, one sees that Blocks 84, 86, and 88 represent failure risk monitoring, task execution time monitoring, and resource blocking monitoring processes, respectively. These monitoring processes can be understood as functions that develop historical data over time, where that historical data includes counts or other indications of task failures versus overall task executions, indications of resource blockings associated with the execution of given provisioning tasks, and timers or other mechanisms for timing how long it takes to execute given provisioning tasks, which may include counting or estimate compute cycles and signaling overhead involved in the task execution. Such data can be collected on a task-by-task basis and/or can be accumulated by task type, task ID, or other parameters by which tasks 12 can be associated or differentiated.

The network node 30 or another network node 50 can process such information to obtain the task failure probabilities used to calculate the compounded failure risk values and blocking penalty values used to reorder tasks 12 from a given predefined workflow 10 into a corresponding reordered workflow 20. In turn, one sees that the block 90 includes provisioning execution and, in at least one embodiment, the dispatching of a reordered workflow 20 by the network node 30 includes full or at least partial execution of the reordered workflow 20 by the network node 30.

In general, the following observations apply: some tasks 12 may need manual intervention, however, most provisioning tasks 12 are automatically performed, a corresponding provisioning service and the optimizations taught herein therefore offer significant "value" in terms of minimizing wasted computing time, blocked resources, etc.; task execution times can differ significantly between different types of tasks 12, e.g., some types of tasks 12 take only milliseconds to complete, while other types of tasks 12 may take several days to complete; within a given predefined workflow 10, some tasks 12 can be rolled back in case of a subsequent failure, while others require restarting the whole workflow and result in temporarily blocked resources; some of the tasks 12 in a given predefined workflow 10 have a strict order, that is some tasks 12 can only be executed after some other tasks 12 are completed, i.e. such tasks 12 use outcomes from the previous tasks 12, while other tasks 12 are independent and can be executed in any order on in parallel; some tasks 12 have a much higher risk of failure during execution as compared to others; and, finally, some service provisioning might be classified as urgent and might benefit from the shortest provisioning time, while less urgent service provisioning is not urgent, such that more aggressive optimization can be used to ensure that such provisioning imposes a lower disruption on the involved network(s).

In an example case, before workflow optimization is performed, the network node 30 identifies all the provisioning tasks 12 that need to be executed in a given predefined workflow 10. The network node 30 further identifies any inter-task dependencies or, conversely, can be understood as identifying the degrees of freedom available for each task 12 in the predefined workflow 10. Here, the "degrees of freedom" can be understood as the extent to which a given task 12 in the predefined workflow 10 can be reordered. Some tasks 12 may have unlimited reordering flexibility—i.e., they are not dependent on the prior execution of any other task 12, nor is any other task 12 strictly dependent on their prior execution. Other tasks 12 may have some inter-task dependencies but can be reordered to the extent permitted by such dependencies, and note subsets of inter-dependent tasks may be reordered as a block or group.

Further, as noted, some tasks 12 cannot be rolled back, which means that some resources allocated in that task 12 are blocked for a certain period of time if the task 12 fails, and further means that the entire set of already-executed tasks 12 needs to be rolled back and re-executed. That is, if a task 12 that cannot be rolled back fails, then all tasks 12 within the same workflow or at least along the same execution path that have been executed in advance of its failure must be performed again as a consequence of that failure. Thus, in case of a rollback, a certain chain of ancestor tasks 12 also needs to be rolled back. This means that the entire sub-graph starting with the highest ancestor needs to be rolled back. For example, in the predefined workflow 10 of FIG. 1, if T6 fails and this means T1 needs to be rolled back, which in turn implies that T5 also needs to be rolled back. Similarly, if T8 fails, both T4 and T0 must be rolled back, meaning that all of their descendent or child tasks 12 need to be rolled back and performed again.

Thus, according to the teachings herein, a reordered workflow 20 is optimized with respect to the predefined workflow 10 from which it is generated, based on the reordered workflow 20 having tasks 12 with higher failure risks generally arranged earlier in the task execution order, and tasks 12 that cannot be rolled back generally arranged towards the end of task execution order. To decide the specific task ordering, the network node 30 first calculated the compounded failure risk value for at least some of the tasks in the predefined workflow 10. The network node 30 does these calculations in one or more embodiments by starting from the last task 12 in the predefined workflow 10 and working backwards, in a breadth-first traversal of the task tree 16.

For each node in the task tree 16, i.e., for each task 12 at each level 18 in the task tree 16, the network node 30 calculates the compounded failure risk value as a function of the task's own failure risk and the failure risk of all its child tasks 12. For example, the compFailureRisk_i=1−(1−failureRisk_i)*mult(1−compFailureRisk_children_i). Here, "i" denotes any i-th task 12 in the predefined workflow 10.

Then, the network node 30 traverses the task tree 16 of the predefined workflow 10, starting from a first task 12 in the predefined workflow 10. The network node 30 pushes the first task 12 onto a logical "stack" and compares all of its child tasks 12. The processing circuit 30 chooses the task 12 that has the highest risk per average execution time ratio (i.e. cr_i=compFailureRisk_i/averageExecutionTime_i). Thus, the network node 30 can be understood as comparing the failure risk of a task 12 per time unit, e.g. due to the invested execution time, rolling back a task with a large execution time is more damaging than rolling back a shorter one. The network node 30 chooses the task 12 with the highest cr_i and pushes it to the stack. All the tasks 12 in the stack represent an "expansion front", and in all the subsequent comparison steps, the network node 30 compares the risk ratio of all the associated child tasks 12 and chooses at each decision point the task 12 with the highest cr_i.

Further, the network node 30 applies special treatment to those tasks 12 that cannot be rolled back. Namely, in at least some embodiments, the network node 30 adds such tasks 12 to the stack only when there is no other task 12 available. When comparing two no-rollback tasks 12, the respective task execution times do not provide an independent basis for deciding task order, because the failure of either no-rollback task 12 requires performing all tasks 12 on the same or linked task execution path(s) 14. Thus, the network node 30 uses blocking penalty values to determine the execution order of any non-rollback tasks 12. In some embodiments, the blocking penalty of a non-rollback task 12 represents the cost of having blocked resources in the network 60 or elsewhere, and it may be computed as blockingPenalty_i=sum(weight_j*blockingTime_j) where j is a blocked resource. Then, the network node 30 can compute the rollback penalty risk: rps_i=compFailureRisk_i*blocking:penalty_i. When the network node 30 compares two non-rollback tasks 12 to decide their execution order, it chooses the one with the lowest rps_i first.

Thus, the network node 30 can be understood as linearizing a predefined workflow 10 in a manner that minimizes execution loss and blocking penalties arising from provisioning task failures. Of course, it is also contemplated to limit or otherwise control optimization as a function of overall objective, such as where there is an urgent need to execute the provisioning tasks 12 included in a given predefined workflow 10 as quickly as possible. In such cases, the network node 30 may not perform optimization at all and instead parallelize task execution as much as permitted in view of any inter-task dependencies. In other instances, such as where overall provisioning times are important but not critical, the network node 30 may use a less aggressive optimization, such as where it identifies one or more subsets of tasks 12 within a predefined workflow 10 and performs optimizations within the one or more subsets 12, but not across the overall predefined workflow 10. This approach allows a hybrid solution wherein the ordering of task subsets may be decided in view of overall provisioning time concerns, while tasks 12 within a given subset are ordered in a manner that minimizes wasted processing cycles or time and blocking penalties.

In such cases of "medium" urgency, the network node 30 identifies task subsets in the linearization stack, where the cr_i of the tasks 12 does not decrease sharply. Thus, the network node 30 generates the reordered workflow 20 to stipulate parallel execution for the tasks 12 in these subsets—subject, of course, to any inter-task dependency constraints. Identifying these subsets is possible, because the cr_i for the tasks 12 in the linearization stack is always monotonically decreasing.

The following pseudo code embodies the above processing and can be understood as a refinement or extension of the method 300 introduced in FIG. 3. The example algorithm includes the following operations:

Get the predefined workflow from a workflow database;
For all tasks in the predefined workflow, get failureRisk, avaergeExecutionTime from a task information database, denoted as InformationDB;
For all implicated resources, get blockingPenalty from Information DB
If performance time of the predefined workflow is not urgent
  For all tasks i, traverse breadth-first, starting with last
    compFailureRisk_i=1−(1−failureRisk_i)*mult(1−compFailureRisk_children_i)
    cr_i=compFailureRisk_i/averageExecutionTime_i
    rps_i=compFailureRisk_i*blocking:penalty_i
  put start_task in stack
  loop while length(stack)<# tasks
    empty buffer
    for all tasks in stack add children to buffer
    for all tasks in buffer move tasks with rps_i>0 to no_rollback_buffer
    if buffer not empty for all tasks in buffer
      choose highest cr_i,
      add this task to stack
    if buffer empty for all tasks in no_rollback_buffer
      choose lowest rps_i
      add this task to stack
If performance time of the predefined workflow is medium-urgent
  Group tasks in stack where (j−1)*step<cr_i≤j*step
  For each subgroup j
    Parallelize workflow according to initial dependencies
    Dispatch reordered workflow, e.g., put reordered workflow in workflow DB.

The above pseudo code may be expanded or modified, without departing from the broadest aspects of teachings herein. For example, as explained, if the performance time of the predefined workflow 10 is of paramount importance, it may be that no optimization is done or that that reordered workflow 20 simply represents the greatest permissible parallelization of tasks 12, aimed at completing the provisioning operations represented by the predefined workflow 10 in the shortest possible overall time, without consideration of the possibility of task failure.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a network node in a communication network, for managing workflows for communication network provisioning, said method comprising:
obtaining an electronic record representing a predefined workflow comprising two or more tasks ordered along one or more task execution paths in a task tree, according to a default task ordering;
obtaining compounded failure risk values for one or more of the tasks in the predefined workflow and, additionally, for one or more of any tasks in the predefined workflow that cannot be rolled back, obtaining blocking penalty values, wherein, for any given task, the compounded failure risk value represents a combination of the probability that execution of the given task will fail and the probabilities that execution of any child tasks in the task tree will fail, and wherein for any given task that cannot be rolled back, the blocking penalty value indicates a cost associated with a temporary blocking of resources arising from an execution failure of the given task;
generating a reordered workflow having a new task ordering that is at least partly optimized with respect to the compounded failure risk values and the blocking penalty values, by, subject to any inter-task dependencies, ordering tasks having higher compounded failure risk values before tasks having lower compounded failure risk values, and ordering tasks that cannot be rolled back after tasks that can be rolled back, including ordering the tasks that cannot be rolled back according to a descending ranking of the corresponding blocking penalty values; and
dispatching the reordered workflow.

2. The method of claim 1, wherein dispatching the reordered workflow comprises storing the reordered workflow in a workflow database as a substitute for the predefined workflow.

3. The method of claim 2, wherein obtaining the electronic record comprising the predefined workflow comprises reading the electronic record from the workflow database.

4. The method of claim 1, wherein obtaining the compounded failure risk values for one or more of the tasks in the predefined workflow comprises reading the compounded failure risk values from an information database that stores the compounded failure risk values, or that stores per-task failure risk values which are not compounded, in which case obtaining the compounded failure risk value for a given task comprises calculating the compounded failure risk value for the task as a function of its failure risk value and as a function of the failure risk values of its child tasks.

5. The method of claim 1, wherein ordering the tasks having higher compounded failure risk values before the tasks having lower compounded failure risk values includes:
obtaining an average execution time value for each task within the predefined workflow that has one or more degrees of freedom with respect to being reordered, and ranking each such task according to corresponding ranking metrics individually computed for each such task as a ratio of the compounded task failure risk of the task to the average execution time of the task; and
ordering the ranked tasks in the reordered workflow so that tasks having higher task failure risks per unit of time are ordered before tasks having lower task failure risks per unit of time.

6. The method of claim 1, further comprising accumulating empirical data on the probability of task failure and average execution time for a plurality of predefined task types, and computing the compounded failure risk values for the one or more tasks in the predefined workflow from the empirical data.

7. The method of claim 1, wherein generating the reordered workflow comprises:
for all tasks in a first subset of tasks defined as tasks that can be rolled back:
computing the compounded failure risk value of each task;
computing a first ranking metric for each task as a ratio of the compounded failure risk value of the task to an average execution time of the task; and
ordering the tasks within the first subset of tasks in descending order of the first ranking metrics, subject to any inter-task dependencies; and
for all tasks in a second subset of tasks defined as tasks that cannot be rolled back:
computing a second ranking metric for each task as a ratio of the compounded failure risk value of the task to the blocking penalty value of the task; and
ordering the tasks within the second subset in descending order of the second ranking metrics and subsequent to the tasks ordered within the first subset of tasks, subject to any inter-task dependencies.

8. The method of claim 1, wherein generating the reordered workflow further includes controlling task reordering according to an overall objective indicating whether the new task ordering shall be optimized with or without consideration of an overall workflow execution time.

9. The method of claim 8, wherein:
if the overall objective indicates that the new task ordering shall be optimized without consideration of the overall workflow execution time, the new task ordering is strictly optimized according to the compounded failure risk values; and
if the overall objective indicates that the new task ordering shall be optimized with consideration of the overall workflow execution time, new task ordering is locally optimized within but not across each of two or more parallel task execution paths comprising the reordered workflow.

10. A network node configured for managing workflows for use in provisioning in a communication network, said network node comprising:
an interface circuit configured to obtain an electronic record representing a predefined workflow comprising two or more tasks ordered along one or more task execution paths in a task tree; and
a processing circuit that is operatively associated with the interface circuit and configured to:
obtain compounded failure risk values for one or more of the tasks in the predefined workflow and, additionally, for one or more of any tasks in the predefined workflow that cannot be rolled back, obtain blocking penalty values, wherein, for any given task, the compounded failure risk value represents a combination of the probability that execution of the given task will fail and the probabilities that execution of any child tasks in the task tree will fail, and wherein for any given task that cannot be rolled back, the blocking penalty value indicates a cost associated with a temporary blocking of resources arising from an execution failure of the given task;
generate a reordered workflow having a new task ordering that is at least partly optimized with respect to the compounded failure risk values and the blocking penalty values, by, subject to any inter-task dependencies, ordering tasks having higher compounded failure risk values before tasks having lower compounded failure risk values, and ordering tasks that cannot be rolled back after tasks that can be rolled back, including ordering the tasks that cannot be rolled back according to a descending ranking of the corresponding blocking penalty values; and
dispatch the reordered workflow.

11. The network node of claim 10, wherein the processing circuit is configured to dispatch the reordered workflow by storing the reordered workflow in a workflow database as a substitute for the predefined workflow, and wherein the interface circuit or another communication interface included within the network node is configured for accessing the workflow database.

12. The network node of claim 11, wherein the processing circuit is configured to obtain the electronic record comprising the predefined workflow by reading the electronic record from the workflow database.

13. The network node of claim 10, wherein the processing circuit is configured to obtain the compounded failure risk values for one or more of the tasks in the predefined workflow by reading the compounded failure risk values from an information database that stores the compounded failure risk values, or that stores per-task failure risk values which are not compounded, in which case the processing circuit is configured to obtain the compounded failure risk value for a given task by calculating the compounded failure risk value for the task as a function of its failure risk value and as a function of the failure risk values of its child tasks.

14. The network node of claim 10, wherein the processing circuit is configured to order the tasks having higher compounded failure risk values before the tasks having lower compounded failure risk values, based on being configured to:
obtain an average execution time value for each task within the predefined workflow that has one or more degrees of freedom with respect to being reordered, and rank each such task according to corresponding ranking metrics individually computed for each such task as a ratio of the compounded task failure risk of the task to the average execution time of the task; and order the ranked tasks for the reordered workflow, so that tasks having higher task failure risks per unit of time are ordered before tasks having lower task failure risks per unit of time.

15. The network node of claim 10, wherein the processing circuit is configured to accumulate empirical data on the probability of task failure and average execution time for a plurality of predefined task types, and compute the compounded failure risk values for the one or more tasks in the predefined workflow from the empirical data.

16. The network node of claim 10, wherein the processing circuit is configured to generate the reordered workflow based on being configured to:

for all tasks in a first subset of tasks defined as tasks that can be rolled back:
  compute a first ranking metric for each task as a ratio of the compounded failure risk value of the task to an average execution time of the task; and
  order the tasks within the first subset of tasks in descending order of the first ranking metrics, subject to any inter-task dependencies; and for all tasks in a second subset of tasks defined as tasks that cannot be rolled back:
  compute a second ranking metric for each task as a ratio of the compounded failure risk value of the task to the blocking penalty value of the task; and
  order the tasks within the second subset in descending order of the second ranking metrics and subsequent to the tasks ordered within the first subset of tasks, subject to any inter-task dependencies.

17. The network node of claim 10, wherein the processing circuit is configured to generate the reordered workflow further based on controlling the task ordering according to an overall objective indicating whether the new task ordering shall be optimized with or without consideration of an overall workflow execution time.

18. The network node of claim 17, wherein the processing circuit is configured such that:

if the overall objective indicates that the new task ordering shall be optimized without consideration of the overall workflow execution time, the new task ordering is strictly optimized according to the compounded failure risk values; and if the overall objective indicates that the new task ordering shall be optimized with consideration of the overall workflow execution time, new task ordering is locally optimized within but not across each of two or more parallel task execution paths comprising the reordered workflow.

\* \* \* \* \*